Figure 10:
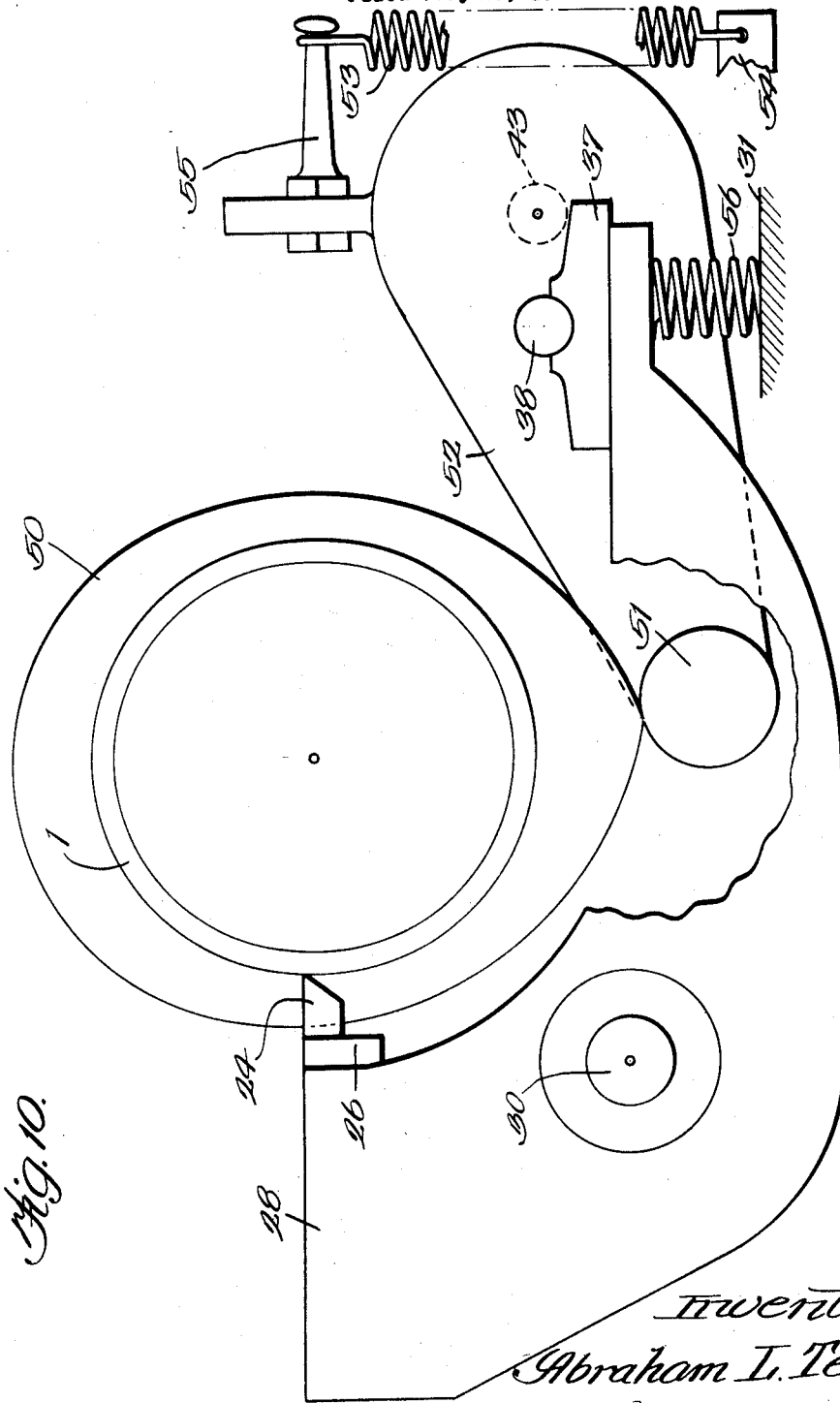

Feb. 26, 1929.
A. L. TEETOR
1,703,559
MACHINE FOR TURNING ECCENTRIC CURVED SURFACES
Filed July 25, 1927        5 Sheets-Sheet 1
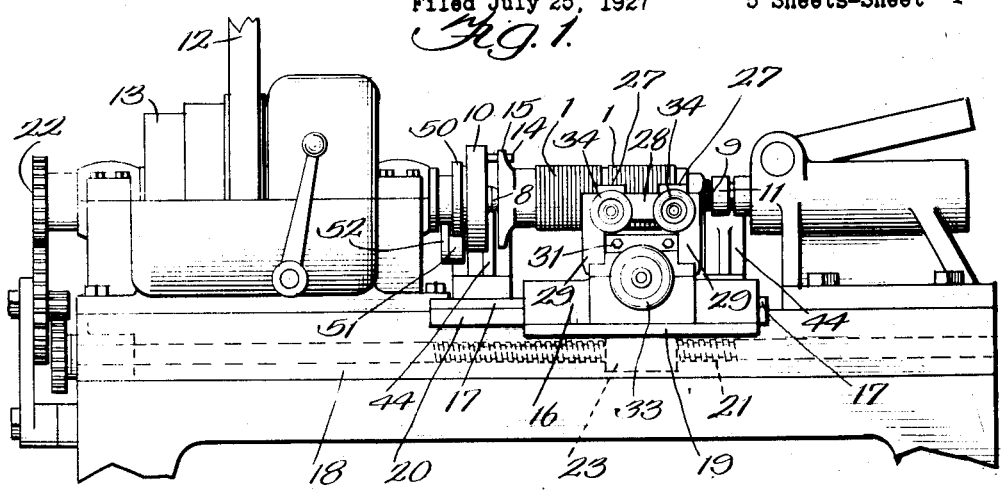
Fig. 1.
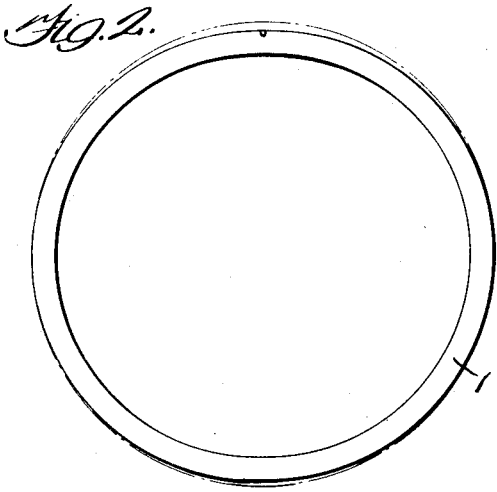
Fig. 2.
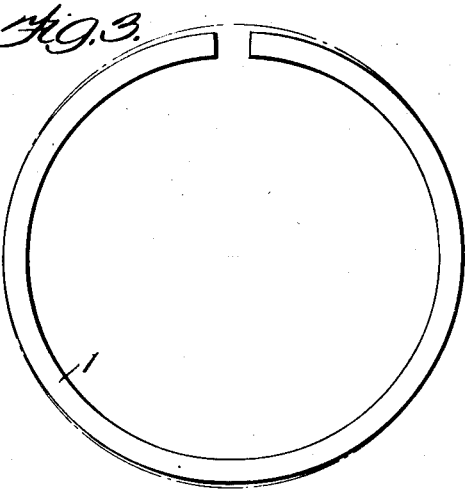
Fig. 3.
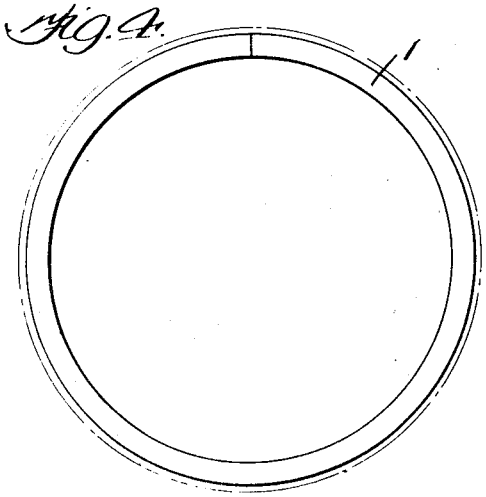
Fig. 4.
Fig. 5.
Inventor:
Abraham L. Teetor
By G. L. Bragg
Atty.

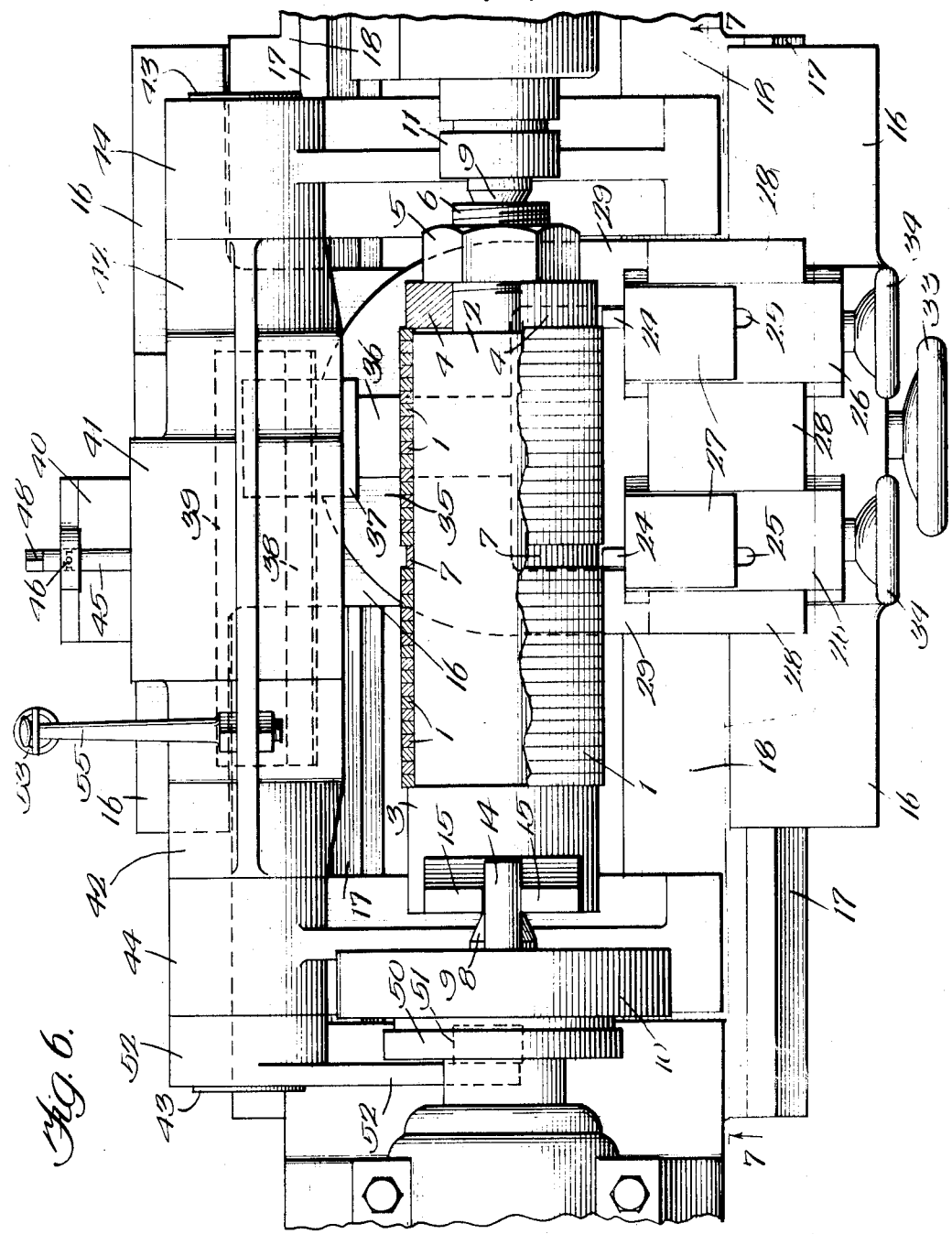

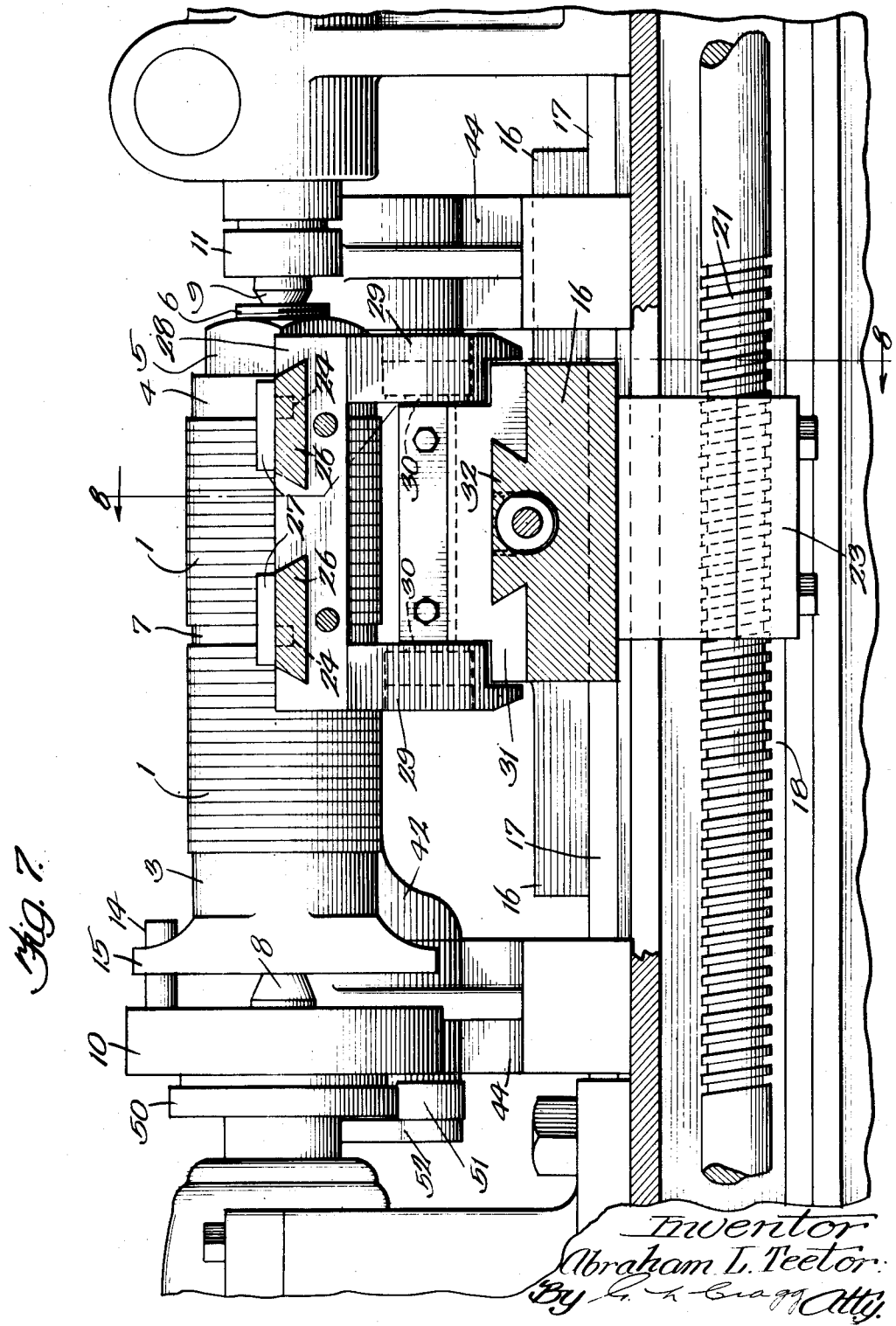

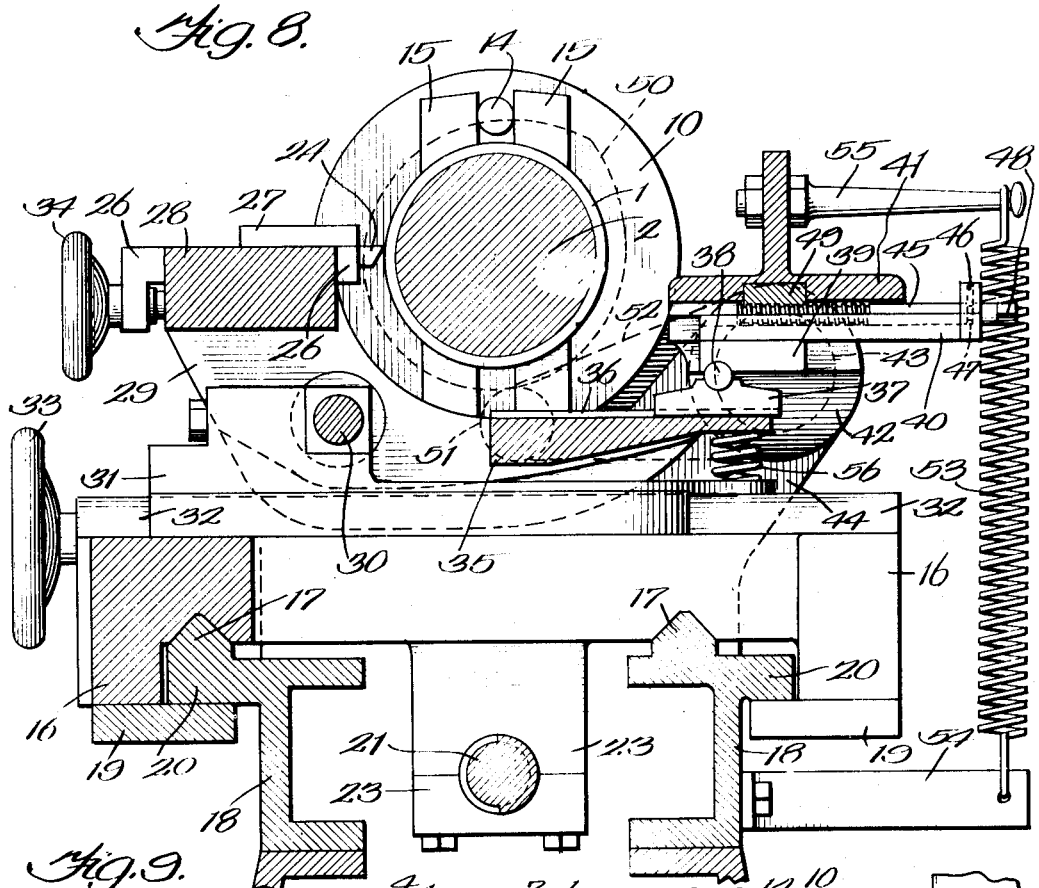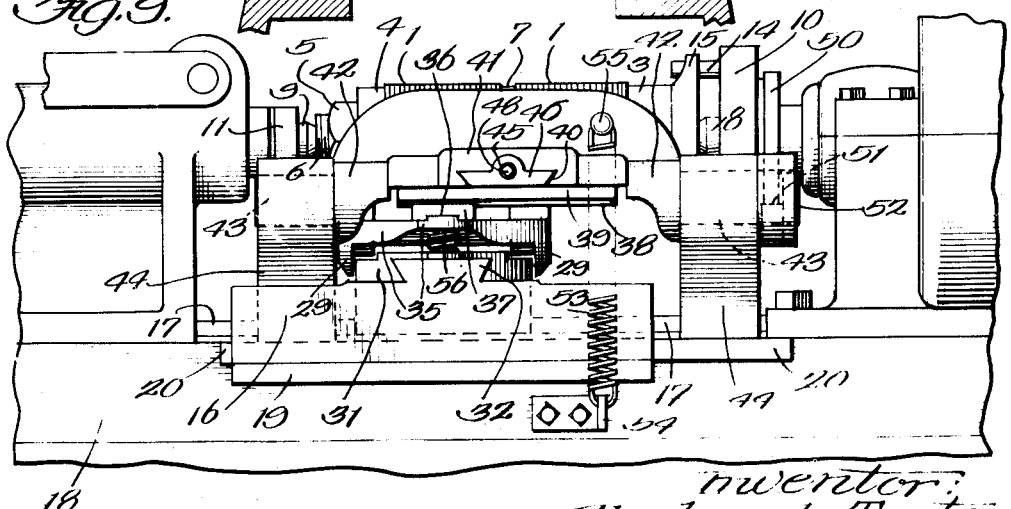

Feb. 26, 1929.

A. L. TEETOR 1,703,559

MACHINE FOR TURNING ECCENTRIC CURVED SURFACES

Filed July 25, 1927   5 Sheets-Sheet 5

Inventor:
Abraham L. Teetor.
By G. L. Gragg Atty.

Patented Feb. 26, 1929.

1,703,559

UNITED STATES PATENT OFFICE.

ABRAHAM L. TEETOR, OF INDIANAPOLIS, INDIANA.

MACHINE FOR TURNING ECCENTRIC CURVED SURFACES.

Application filed July 25, 1927. Serial No. 208,289.

My invention relates to machines for cutting objects into predetermined shape and is of particular use in finishing the manufacture of piston or packing rings, though the invention is not to be limited to any particular use to which it may be put.

In the machine of my invention the path followed by the cutting edge of the cutting tool is determined by a master cam which is proportioned to the shape of the work. The machine is adjustable to enable the employment of one master cam for producing many or a group of sizes, an advantage which is particularly important in the art of making piston rings. In carrying out the invention the cutting tool is constrained to move away from the work, the cam serving to move the cutting tool toward the work. The tendency of the cutting tool to move away from the work in conjunction with the opposite effect of the cam eliminates the tendency of the cutting tool to chatter.

With the machine of my invention it is possible to correct the cam merely by trimming it or cutting it away whether the fault causes the cutting tool to cut too deeply or not deeply enough, thus eliminating the necessity of adding to or building up the cam, the machine being readjusted to compensate for reduction in the size of the cam. This is obviously an important advantage, particularly in the art of making piston or packing rings.

In the preferred embodiment of the invention the cutting tool is carried upon an intermediately pivoted lever, the cutting tool being separably secured to the lever for adjustment, replacement and repair. The tool is located upon one side of the lever fulcrum, there being a second lever which is pivoted at one end and is in engagement with the cam at its other end, the end of the first lever opposite to that where the tool is carried having engagement with the second lever between the fulcrum and cam engaging end of the latter lever. Spring means operate upon both levers to constrain the tool away from the work and to maintain the second lever in engagement with the cam, whereby the tool is accurately controlled to effect accurate cutting.

The invention will be more fully explained in connection with the accompanying drawings in which Fig. 1 is a side elevation of the preferred embodiment thereof; Fig. 2 is a face view of a piston ring casting after it is finished by the machine of my invention; Fig. 3 is a view illustrating the finished ring casting with a section thereof cut away to enable the ring to have true circular form when the ring ends are brought together; Fig. 4 illustrates the ring of Fig. 3 with the ends brought together; Fig. 5 is an edge view of the ring shown in Fig. 4 with parts cut away; Fig. 6 is a plan view of the machine with parts shown in section; Fig. 7 is a sectional view on line 7—7 of Fig. 6; Fig. 8 is a sectional view on line 8—8 of Fig. 7; Fig. 9 is an opposite side view of the machine; and Fig. 10 is a view diagrammatically illustrating the machine.

The work operated upon by the machine is shown in the form of piston ring castings 1 which are placed in a mandrel or work holder 2 and are clamped between the end plates 3 and 4 by means of a nut 5 which is screwed upon the reduced threaded end 6, there being preferably a spacing ring 7 which divides the ring castings into two groups. The mandrel is centered by and between the coaxial spindles 8 and 9 disposed at the head and tail stocks 10 and 11 in a manner well known and requiring no description. The head stock is rotated in any suitable way as by means of the belt 12 and pulleys 13 and serves to turn the mandrel by means of a pin 14 carried by the head stock and interposed between the bars 15 which are carried by the mandrel. The mandrel overlies the tool carriage 16 which is arranged to travel longitudinally of the mandrel upon the guides 17 that are carried by machine bed 18. The carriage is maintained in snug sliding engagement with the guides by means of the plates 19 which are adapted to the bottom carriage and underlie the wing portions 20 of the machine bed. The feed screw 21 for effecting the measured travel of the carriage longitudinally of the mandrel is arranged below the carriage and is driven at suitable speed through the intermediation of gearing 22 which is interposed between the feed screw and the shaft of the pulley 13. A split sleeve structure 23 depends from the carriage and is threaded to have engagement with the screw 21 whereby travel of the carriage is effected.

There are desirably two cutting tools 24, each individual to one of the piston ring groups that are separated by the spacing ring 7. Each cutting tool is suitably disposed within a slot 25 in a mounting block 26, each slot being almost completely covered by the cover 27. The blocks 26 are movable at right angles to the axis of the mandrel, these blocks being dove tailed in cross section and received within dove tailed grooves formed in the base portion 28 of a U-shaped lever whose sides 29 extend beneath the mandrel and are journaled upon a shaft 30 extending longitudinally of the mandrel and below the lever portion 28. The shaft 30 is carried by a block 31 which has a dove tailed groove in its bottom side extending crosswise of the mandrel and receiving the dove tailed tenon 32 which is provided upon the carriage 16. The hand wheel 33 and its shaft are employed to determine the position to which the block 31 and the shaft 30 together with the cutting tool carrying lever 28, 29 journaled on said shaft may be moved transversely of the mandrel whereby the tools 24 are simultaneously adjustable. The adjusting wheels 34 and their shafts are individual to the mounting blocks 26, the cutting tools 24 being individually adjustable by turning said wheels.

The shaft 30 is located between the ends of the lever 28, 29, the cutting tools 24 being on one side of the fulcrum of the intermediately pivoted lever. A web 35 is cast integrally with the lever sides 29 at the other end of the lever, the fulcrum shaft 30 being between the web 35 and the tool carrying portion 28. The web 35 has a tenon formation 36 which is received within a groove in the sliding block 37. The upper side of the block 37 has a groove or recess of cylindrical curvature formed therein in which the cylindrical side of a feather 38 is received, this feather being horizontal and extending longitudinally of the mandrel, and being elongated so as to maintain its engagement with the block 37 throughout the range of travel of this block as it moves longitudinally of the mandrel with the lever 28, 29. The block 37 is preferably operated at such height that the center line of feather 38 will move above and below the axis of shafts 43 to about equal distances. The cylindrical feather 38 is desirably welded to a block 39 which is integrally formed with and depends from the slide 40 which has dove tailed connection with the base portion 41 of a U-shaped lever whose sides 42 carry said stud shafts 43 that are journaled in stationary brackets 44 fixed upon the bed of the machine.

The intermediately pivoted traveling lever 28, 29 has sliding connection, at its end opposite the end thereof where the tools 24 are disposed, with the non-traveling lever 41, 42 through the intermediation of the web 35, the block 37, the cylindrical feather 38, the block 39 and the slide 40 that has dovetailed connection with the lever portion 41, as hitherto stated, this sliding connection permitting movement of the traveling lever 28, 29 longitudinally of the mandrel and between the lever sides 42 that have stationary bearings. The sliding connection between the web 35 and block 37 permits shifting of the engagement of the levers transversely of the mandrel toward and from fulcrum 43. The location of the feather may be shifted transversely of the mandrel and toward and from fulcrum 43 to adapt the machine to the cutting of rings of different sizes to which end an adjusting screw 45 is mounted to turn within a collar 46 upon the slide 40, this collar carrying a portion received within a groove 47 formed in the screw 45 whereby the screw is held from longitudinal movement with respect to the slide 40. The screw has a tool engaging formation 48 whereby it may be turned. The threaded portion of the screw engages a threaded block 49 fixed upon the lever portion 41. As the screw 45 is turned, the slide 40 is moved toward or from the mandrel whereby the location of the feather 38 is shiftable toward and from the mandrel axis and fulcrum 43. A single cam 50 is fixed with respect to the mandrel, being preferably directly secured upon the head stock 10. A cam roller 51 is carried upon a lever arm 52 which is secured to one of the stud shafts 43, the arm 52 thus being a part of a unitary lever structure that also includes the lever portions 41 and 42 and the stud shafts 43. Said cam roller is engaged with the cam 50.

The lever 28, 29 is pressed to constrain movement of the tools 24 away from the work holder or mandrel and the piston ring castings or work on the work holder. The lever structure 41, 42, 51, 52 is maintained in relation to the cam by the engagement of its roller 51 with the cam by a suitable constraining agency which also tends to move the cutting tools away from the work. This constraining agency is shown as including a coiled spring 53 anchored at one end to the stationary post 54 and at its other end to the post 55 on the lever part 41. Said constraining agency is also shown as including a coiled spring 56 which is bottomed upon the block 31 and presses upwardly upon the adjacent end of the lever 28, 29, being preferably directly in engagement with the web 35. Said springs constrain the cutting tools to move away from the work and constrain the roller carrying lever structure 41, 42, 51, 52 into engagement with the cam 50 through the intermediation of the roller 51 whereby the cutting tools are forced toward the work. The levers are so disposed and the springs are so arranged and so function that the positions of the cutting tools are ultimately dependent upon the engagement of the cam and cam roller, the springs being of sufficient strength to maintain the cam and cam roller in engagement to hold the tools in their cutting positions and against the resistance offered by the work. Hitherto, the tools were apt to chatter inasmuch as the work would effect slight movements thereof away therefrom. In the machine of my invention, the cam 50 and the cam roller 51 cooperate with the levers to prevent the work from having this chattering effect upon the tools.

It is observed that the cam illustrated is of a shape that is reverse to that of the work or product resulting from its use, the cam being of lower height to lessen the depth of the cutting and of greater height to increase the depth of the cutting, as desired, the compound lever arrangement illustrated holding the cutting tool down to a predetermined line of cut. The location of the feather 38 may be shifted toward the axis of shafts 43 until the axis of the feather substantially coincides with the axis of said shafts, at which point the effect of the cam 50 is neutral, all adjustments of the feather from its neutral position toward the mandrel being in the range of effective cam operations. Adjustments toward coincidence of said axes are effected for the smaller sizes of rings or other work and adjustments away from such coincidence are effected for larger sizes of work. The peripheral movement of the cam is suitably fifteen times the coincident movement of the cutting tool.

An important advantage resulting from the machine of my invention resides in the ease with which the cam may be shaped to suit the contour of the work. If, for example, the cutting tools should cut too deeply at certain portions of the ring castings, the cam need merely be ground away at corresponding portions thereof. That is, by grinding the cam away, the depth of the ring is increased. If the cutting tools do not cut deeply enough, the cam may be trimmed to correspond. If the tool cuts too deeply or not deeply enough, the cam may be cut down at corresponding zones, the cutting being diametrically opposite from the points at which the faults occur, the remedial effects being thereby obtained. Thus the cam is not added to but is subtracted from to correct these errors. If the cam in being corrected should not be suited to the size of the work, it is made suitable by adjusting the location of the feather 38 toward or from the mandrel. This adjustment of the feather 38 is also employed when it is desired to readapt the machine to the finishing of rings of distinctly different sizes.

Changes may be made without departing from the invention.

Having thus described by invention, I claim:

1. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable longitudinally of the work holder axis, in the operation of the machine; spring means constraining the intermediately pivoted lever to move the cutting tool away from the work and constraining the other lever to engage said cam; and mechanism for adjusting the engagement of the levers toward and from the axis of the work holder and the fulcrum of the second lever.

2. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable longitudinally of the work holder axis, in the operation of the machine; and spring means constraining the intermediately pivoted lever to move the cutting tool away from the work and constraining the other lever to engage said cam.

3. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable longitudinally and transversely of the work holder axis, in the operation of the machine; spring means constraining the intermediately pivoted lever to move the cutting tool away from the work and constraining the other lever to engage said cam; and mechanism for adjusting the engagement of the levers toward and from the axis of the work holder and the fulcrum of the second lever.

4. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable longitudinally and transversely of the work holder axis, in the operation of the machine; and spring means constraining the intermediately pivoted lever to move the cutting tool away from the work and constraining the other lever to engage said cam.

5. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable transversely of the work holder axis, in the operation of the machine; spring means constraining the intermediately pivoted lever to move the cutting tool away from the work and constraining the other lever to engage said cam; and mechanism for adjusting the engagement of the levers toward and from the axis of the work holder and the fulcrum of the second lever.

6. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having engagement with the other lever between the fulcrum and cam engaging end of the latter lever, this engagement being shiftable transversely of the work holder axis, in the operation of the machine; and spring means constraining the intermediately pivoted lever to move the cutting tool away from the work and constraining the other lever to engage said cam.

7. The combination with a rotatable work holder; of a cam coupled with the work holder; an intermediately pivoted lever carrying a cutting tool on one side of its fulcrum for presentation to the work upon the work holder; a lever pivoted at one end and engaging the cam at its other end, the intermediately pivoted lever having connection on the other side of its fulcrum with the other lever between the fulcrum and cam engaging end of the latter lever; spring means constraining the intermediately pivoted lever to move the cutting tool away from the work and constraining the other lever to engage said cam; and mechanism for adjusting the connection of the levers toward and from the axis of the work holder and the fulcrum of the second lever.

8. The combination with a rotatable work holder; of a cam coupled with the work holder; a lever carrying a cutting tool for presentation to the work upon the work holder; a second lever having engagement at one end with the cam; an adjustable means of junction, acting between the first and second levers whereby the action of the cam may be reduced to or from its greatest effect to a lesser or no effect, the engagement of the levers being shiftable toward and from the axis of the work holder in the operation of the machine; and spring means constraining the first lever to move the cutting tool away from the work on the work holder and constraining the second lever to engage said cam.

In witness whereof I hereunto subscribe my name.

ABRAHAM L. TEETOR.